(12) United States Patent
Fandella

(10) Patent No.: US 7,757,838 B2
(45) Date of Patent: Jul. 20, 2010

(54) LINK OF CONVEYOR CHAIN

(75) Inventor: Sergio Fandella, Mogliano Veneto (IT)

(73) Assignee: Habasit AG, Reinach (CH)

( * ) Notice: Subject to any disclaimer, the term of this patent is extended or adjusted under 35 U.S.C. 154(b) by 725 days.

(21) Appl. No.: 11/480,987

(22) Filed: Jul. 6, 2006

(65) Prior Publication Data

US 2007/0034485 A1 Feb. 15, 2007

(30) Foreign Application Priority Data

Aug. 12, 2005 (IT) .......................... TV2005A0120

(51) Int. Cl.
*B65G 17/00* (2006.01)
*B65G 17/06* (2006.01)
*B65G 17/38* (2006.01)
(52) U.S. Cl. ...................... 198/779; 198/850; 198/851; 198/853
(58) Field of Classification Search ................. 198/779, 198/850, 851, 853
See application file for complete search history.

(56) References Cited

U.S. PATENT DOCUMENTS

| 2,494,302 | A | | 1/1950 | Mason | |
|---|---|---|---|---|---|
| 3,554,360 | A | * | 1/1971 | Bildsoe ...................... | 198/833 |
| 3,853,276 | A | * | 12/1974 | Fisher ......................... | 241/247 |
| 4,909,380 | A | * | 3/1990 | Hodlewsky ................. | 198/779 |
| 5,101,982 | A | * | 4/1992 | Gentili ....................... | 209/556 |
| 5,311,982 | A | * | 5/1994 | Clopton ....................... | 198/779 |
| 5,344,001 | A | * | 9/1994 | Kawaai et al. .............. | 198/779 |
| 6,997,309 | B2 | * | 2/2006 | Stebnicki et al. ............ | 198/850 |
| 7,578,384 | B2 | * | 8/2009 | Fandella ................... | 198/844.1 |
| 2002/0020609 | A1 | * | 2/2002 | Lapeyre et al. .............. | 198/779 |
| 2006/0144678 | A1 | * | 7/2006 | Fandella ..................... | 198/851 |

FOREIGN PATENT DOCUMENTS

| DE | 35 41 364 A1 | | 12/1986 |
|---|---|---|---|
| DE | 100 27 229 A1 | | 12/2001 |
| EP | ITTV20050121 | * | 11/2005 |
| NL | 1 010 530 C2 | | 5/2000 |

OTHER PUBLICATIONS

International Preliminary Report on Patentability, Jan. 7, 2008.

* cited by examiner

*Primary Examiner*—Gene Crawford
*Assistant Examiner*—Yolanda Cumbess
(74) *Attorney, Agent, or Firm*—Hodgson Russ LLP

(57) ABSTRACT

A link of a conveyor chain, connectable to similar links comprising a main base body with two shoulders, which protrude upward from the ends of the transverse sides of the main base body and are parallel to the direction of advancement of the chain. Ends of a pair of first and second shafts are associated with the pair of shoulders, first rollers being rotatably associated with the shafts. Second rollers are associated on the pair of first and second shafts, have a smaller diameter than the first rollers, and are supported in a loading condition by first supporting elements, activatable under load and protruding from the main base body. The link further comprises a slider, supported by at least one pair of second supporting elements, protruding from the main base body and has free ends supported on the base body.

12 Claims, 5 Drawing Sheets

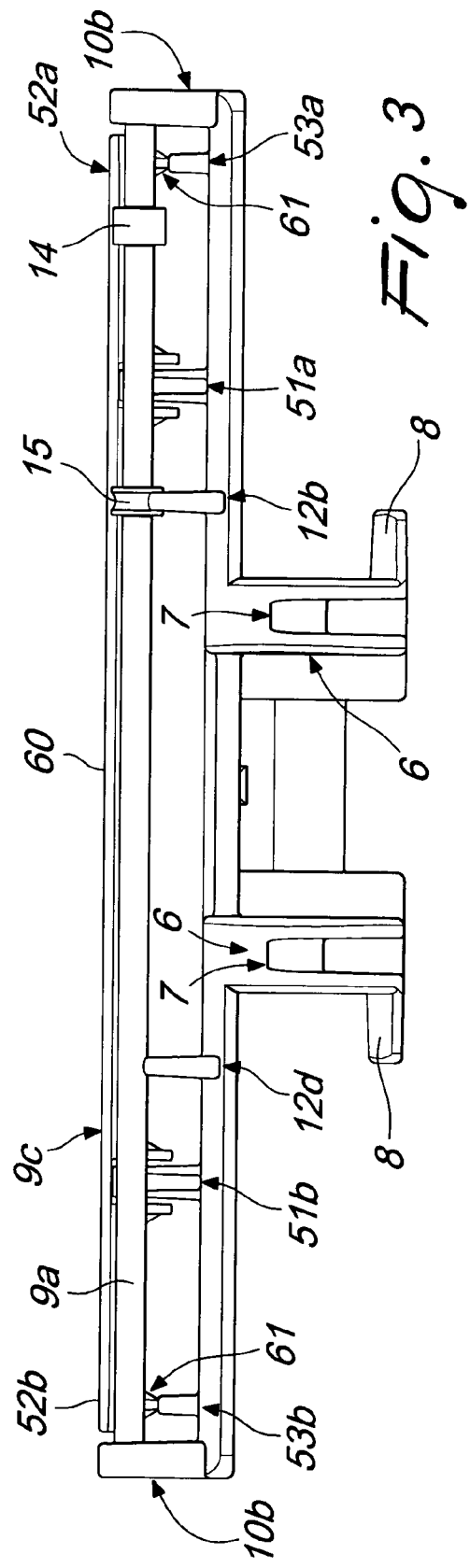
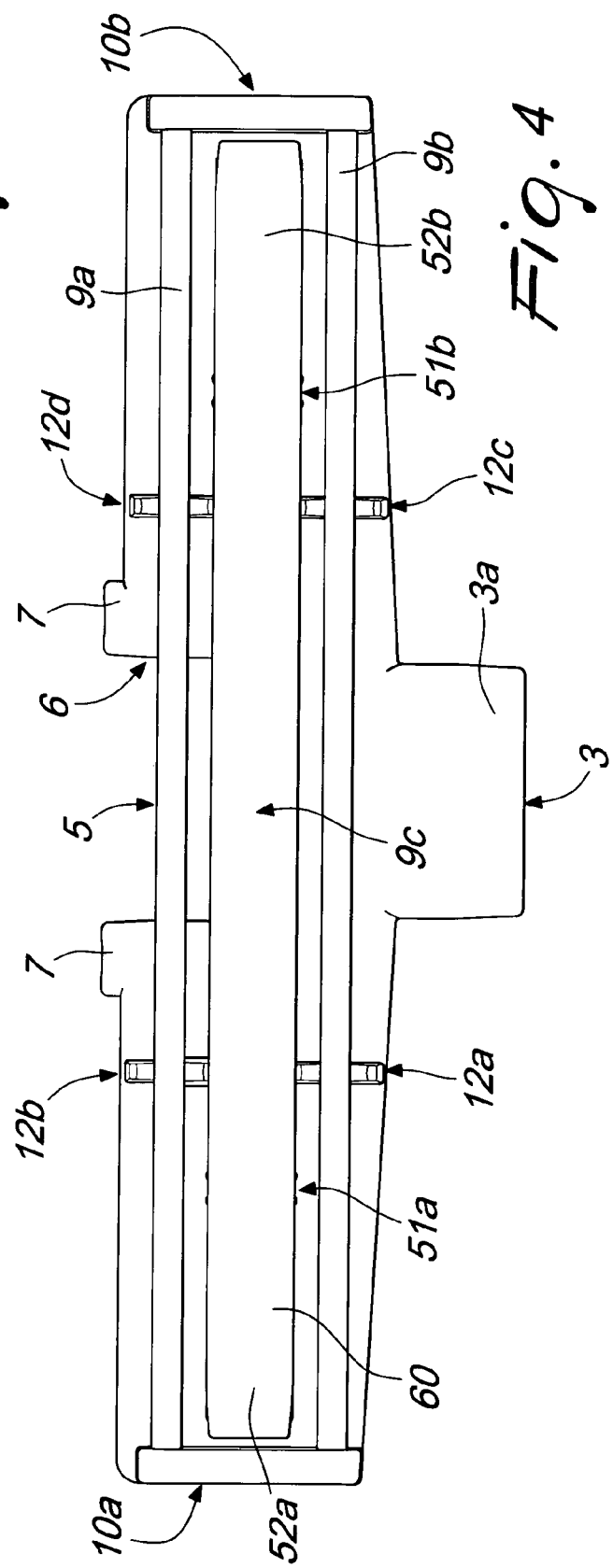

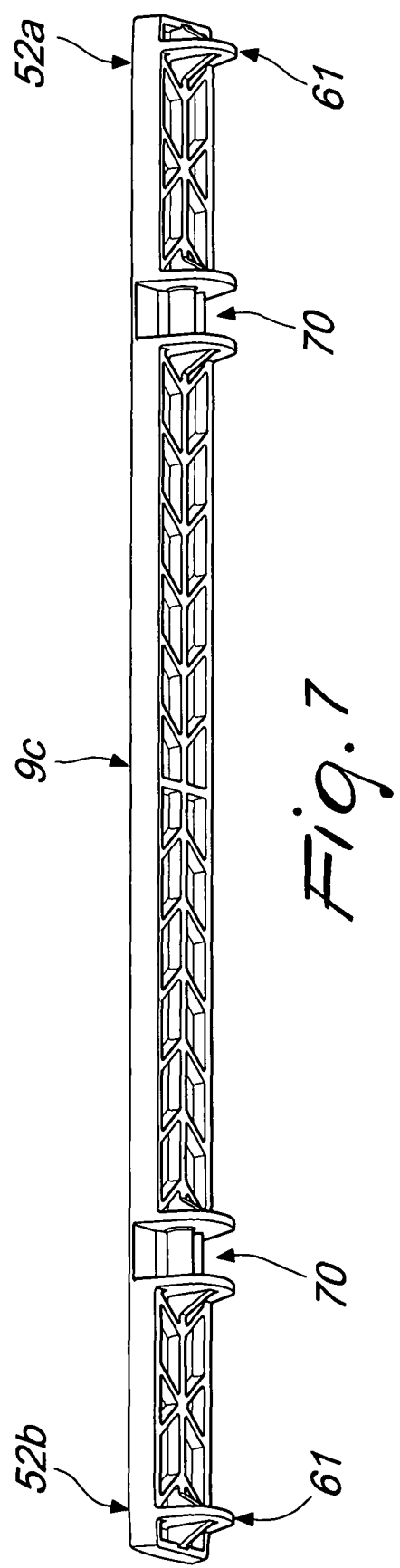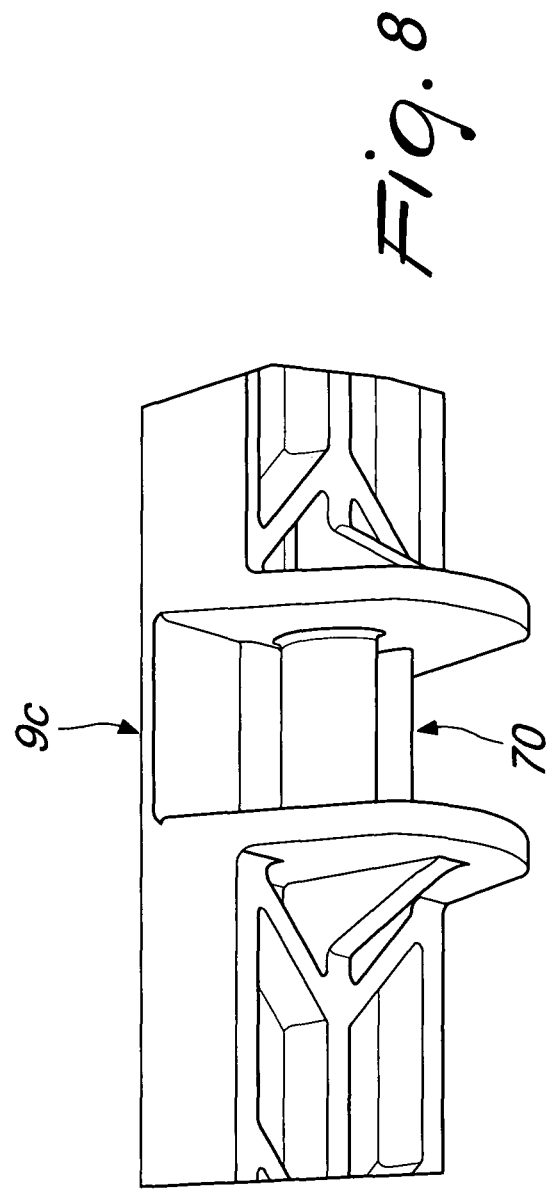

LINK OF CONVEYOR CHAIN

The present invention relates to a link of a conveyer chain.

BACKGROUND OF THE INVENTION

In the provision of industrial systems for bottling liquids or for packaging goods of various kinds, the design of suitable systems for moving the products from one processing station to the next and toward the store is very important.

In performing the production cycles provided by these systems, it is often necessary to convey and stop the conveyed products in chosen positions, so as to be able to perform the various steps provided by such process, such as for example the filling of bottles, their closure, or the packaging of products of various kinds, or the accumulation of packages or containers.

Known types of conveyor chain, composed of a plurality of links which are mutually interconnected so as to form a chosen path, which can comprise straight and curved portions, are currently in use for moving goods within systems in which the working cycles provide for conveying or stopping the products in one or more positions.

One particularly strongly felt need is to allow the products to stop in the chosen positions without requiring the simultaneous stopping of the conveyor chain, which would entail high complexity in production and high costs for its operation.

For this purpose, it is known to manufacture conveyor chains which are constituted by interconnecting a plurality of links, each of which comprises a base body which has a substantially rectangular plan shape and on the transverse sides of which one or more shafts are supported which are arranged longitudinally with respect to the base body and transversely to the direction of advancement of the products on the chain; a plurality of rollers are associated with said shafts so that they can rotate freely and constitute the upper conveyance surface of the chain. A first known type of link provides, on the transverse sides of the base body, a plurality of seats which are approximately U-shaped and are open upward for supporting the one or more shafts, the ends of which are inserted from above into said seats; a plurality of mutually identical rollers are associated rotatably on said shafts.

A second known type of link has, at the transverse sides of its base body, a plurality of through holes, which are for example aligned in pairs and within which the ends of the one or more shafts are inserted and thus supported; a plurality of mutually identical rollers are associated rotatably with these shafts as well.

In both of these known embodiments, if the products to be moved have bulky loads, the shafts, owing to their longitudinal extension, are made to rest, in one or more of their intermediate points, on a corresponding number of supports, which protrude upward from the base body and have a seat for rotatably accommodating a portion of said shaft.

The presence of the rollers in said links of the known type allows to convey the products and to stop them without having to interrupt the movement of the conveyor chain.

The moved product can in fact be blocked in the chosen position by means of a retention barrier without generating an intense friction force with respect to said chain thanks to the interposition of the rollers which, by rotating about the shaft that supports them, reduce drastically the extent of said force; in this manner, the presence of stationary objects on the chain does not constitute a hindrance to the advancement of said chain.

The main drawback that can be observed in these known types of conveyor chain is that they have high wear of the intermediate supports, since the shaft that rests on them, if turned by the rollers that it supports, slides continuously on said intermediate supports, even in the presence of light loads on the conveyor chain.

Another drawback of known types of conveyor chain is that since each shaft rests directly on the corresponding intermediate support, it is extremely difficult to clean this region of the conveyor chain, and therefore debris from the outside environment or from the conveyed products, such as for example dust or splinters caused by the breakage of glass bottles, can penetrate between the shaft and the intermediate supports, increasing the drag of the chain and accelerating its wear; accordingly, long line downtimes are necessary in order to perform the required cleaning operations.

Another drawback of said known types of conveyor chain is that at the intermediate supports there is a considerable discontinuity in the upper supporting surface, which may give rise to an imperfect placement of the product on the chain, especially when such product has a narrow resting base, consequently hindering the correct execution of the cycle of the system within which said chain is inserted.

Finally, the use of a large number of rollers entails a considerable cost increase, since usually each link has at least three rows of rollers and each chain can be tens of meters long.

SUMMARY OF THE INVENTION

The aim of the present invention is to solve the above mentioned problems, eliminating the drawbacks of the cited background art, by providing a device which allows to achieve low wear of the conveyor chain, even if it is used to convey material having a certain weight or if bulky loads are used.

Within this aim, an object of the invention is to provide a device which allows quick and easy cleaning, so as to reduce line downtimes.

Another object is to provide a device which allows optimum placement of the conveyed products even if said products have a narrow resting base.

Another object is to provide a device which is structurally simple and has low manufacturing costs.

This aim and these and other objects, which will become better apparent hereinafter, are achieved by a link of a conveyor chain., which comprises means for articulated connection to a similar and adjacent link and a main base body which comprises two shoulders, which protrude upward from the ends of the transverse sides of said main base body and are arranged parallel to the direction of advancement of said chain, the ends of a pair of first and second shafts being associated with said pair of shoulders, first rollers being rotatably associated with said shafts, characterized in that second rollers are associated on said pair of first and second shafts, have a smaller diameter than said first rollers, and are supported in a loading condition by at least one pair of first supporting elements, which can be activated when a load passes and protrude from said main base body and lie on the same plane or on a different plane which is transverse with respect to said pair of first and second shafts, and in that it comprises a slider, which has an upper surface which lies on a plane which is approximately tangent to the adjacent lateral surfaces of said first and second shafts, said slider being supported by at least one pair of second supporting elements, which protrude from said main base body and lie on a plane which is parallel and distinct with respect to the plane of arrangement of said first supporting elements, the ends of said slider being free and being supported on said main base body.

BRIEF DESCRIPTION OF THE DRAWINGS

Further characteristics and advantages of the invention will become better apparent from the following detailed description of a particular but not exclusive embodiment thereof, illustrated by way of non-limiting example in the accompanying drawings, wherein:

FIG. 3 is a front view of the invention of FIG. 2, with a single first and second roller inserted;

FIG. 4 is a top view of the invention;

FIGS. 7 and 8 are a perspective view and a detail view of the slider.

DESCRIPTION OF THE PREFERRED EMBODIMENTS

Figure 1:
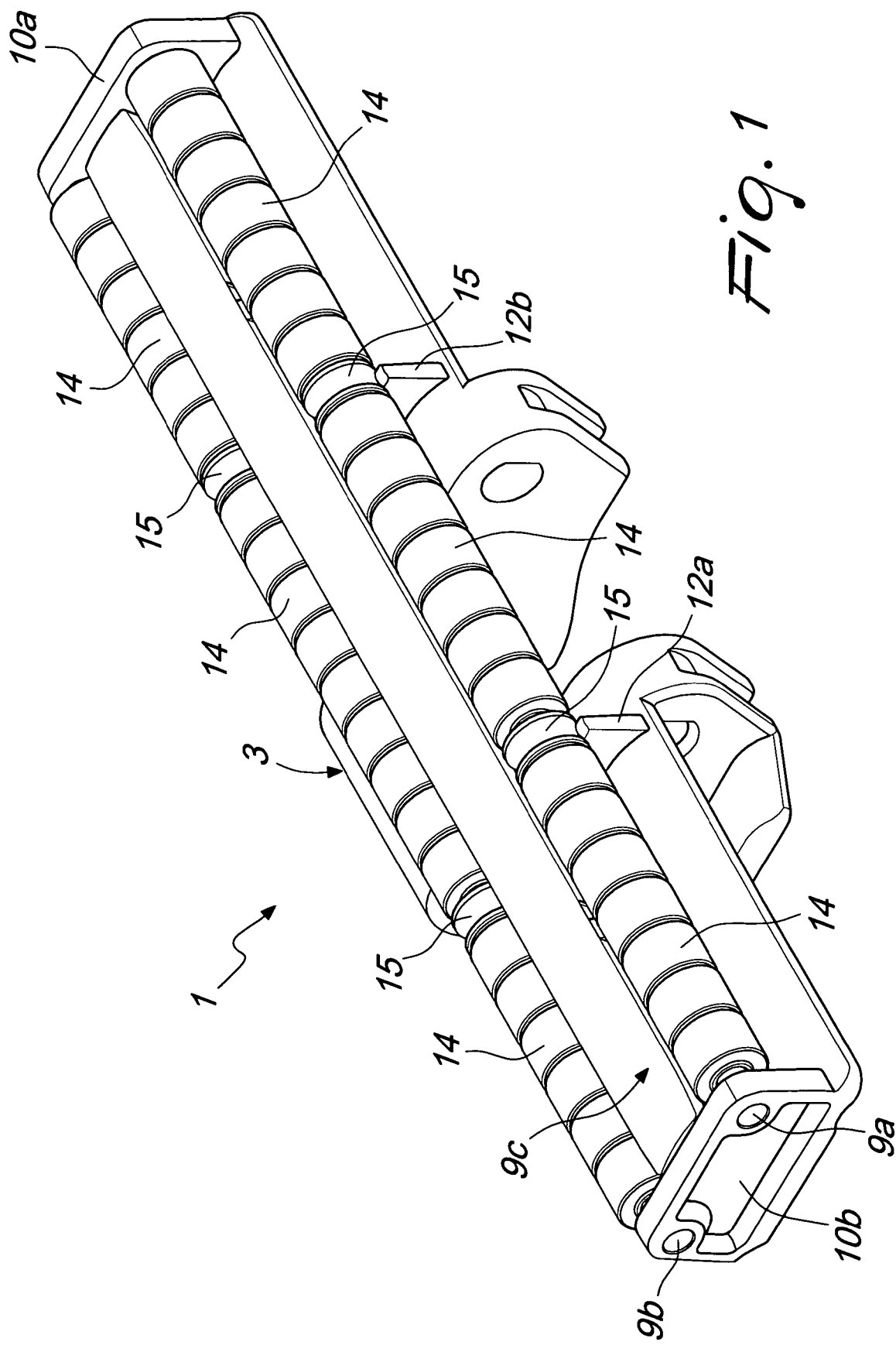
FIG. 1 is a top perspective view of a link of a chain according to the invention.
Figure 2:
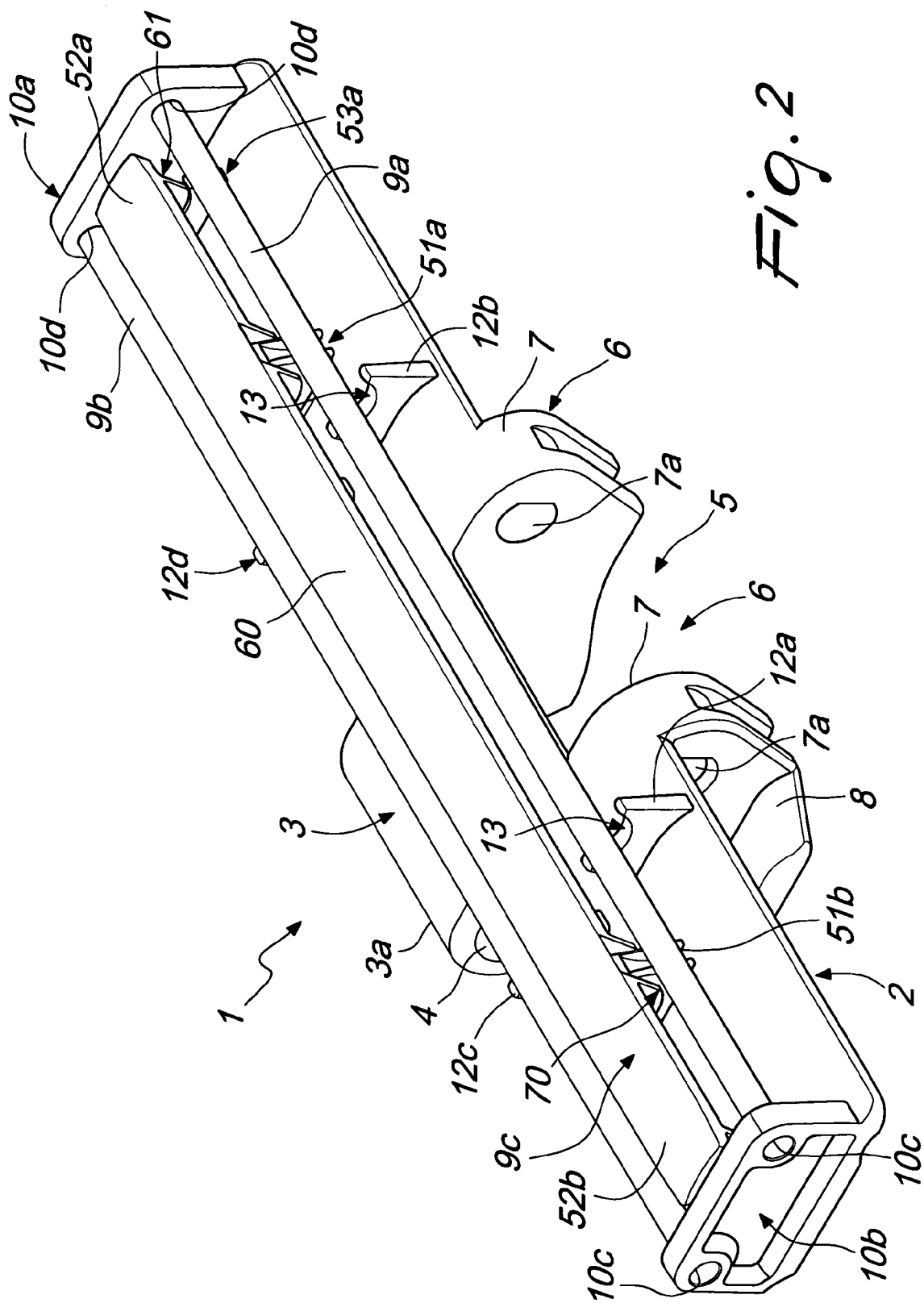
FIG. 2 is a view, similar to FIG. 1, of the invention, in which the first and second rollers have been omitted.
Figure 5:
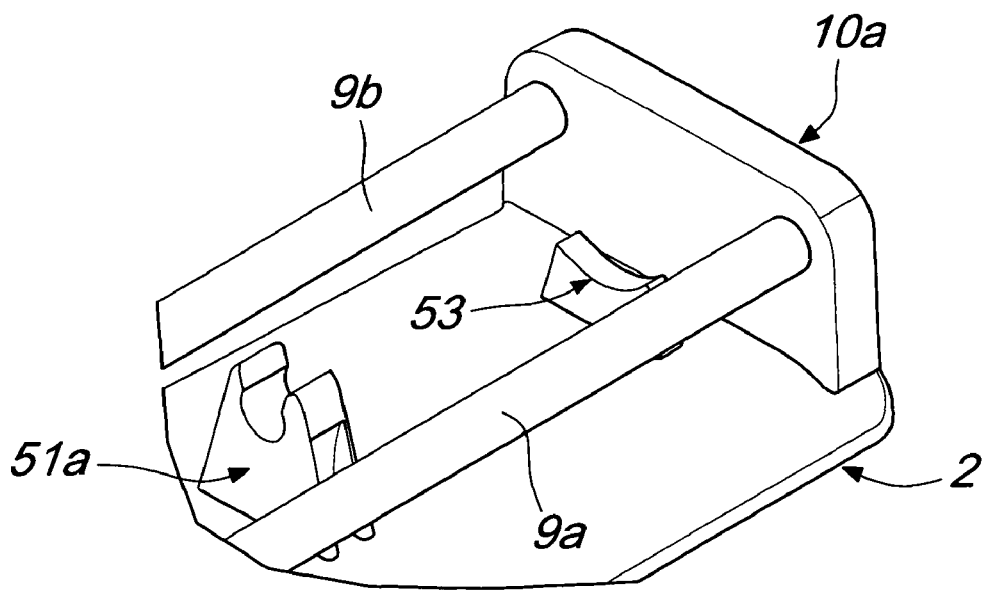
FIG. 5 is a view of a detail of the invention.
Figure 6:
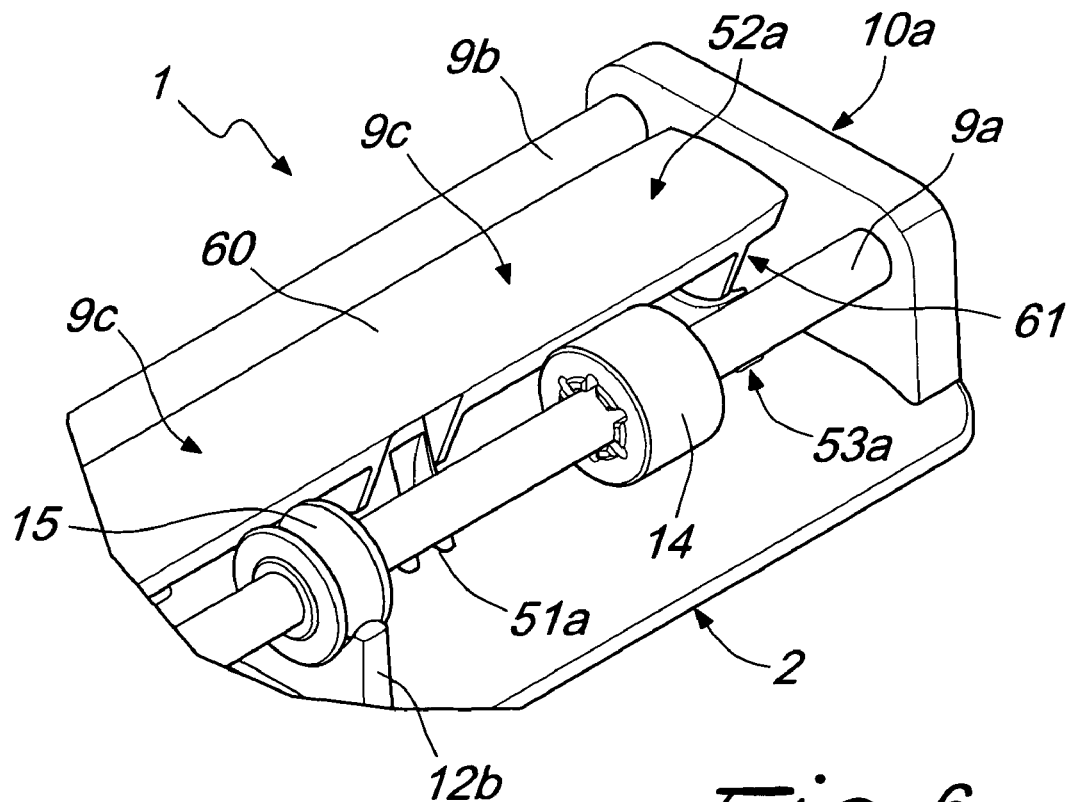
FIG. 6 is a view of a detail of the invention with a first roller and a second roller, shown in partial cross-section, inserted therein.

In the exemplary embodiments that follow, individual characteristics, given in relation to specific examples, may actually be interchanged with other different characteristics that exist in other exemplary embodiments.

Moreover, it is noted that anything found to be already known during the patenting process is understood not to be claimed and to be the subject of a disclaimer.

With reference to the figures, the reference numeral 1 designates a link of a conveyor chain according to the invention, which is constituted by a main base body 2, which is approximately flat and has an approximately rectangular plan shape.

Two wings 6 can protrude downward from the base body 2, in its central region, and are preferably L-shaped and arranged symmetrically with respect to a central plane of the link 1.

The link 1 comprises known connection means for articulated connection to a similar and adjacent link, so as to allow the provision of a conveyor chain which is constituted by a succession of several links 1, which are mutually identical and are arranged consecutively with respect to each other along the advancement direction of said chain.

Such connection means for articulated connection are constituted by a lug 3, which is arranged between the wings 6, protrudes at the front and centrally from the main base body 2, and has an approximately trapezoidal plan shape, with its smaller parallel side directed forward.

A first bush or a hole 4 is formed on the lug 3, proximate to its front end 3a, and its axis is arranged transversely with respect to the advancement direction of the conveyor chain.

The lug 3 can be accommodated within an approximately complementarily shaped first seat 5, which is formed centrally at the rear edge 2a of the main base body 2 of an adjacent link 1; the first seat 5 has, in plan view, an approximately rectangular shape, which is slightly wider than the lug 3, and is open at the rear edge 2a, so as to allow the insertion of said lug within said seat with a chosen functional play.

Two ridges 7 are formed on the wings 6 at said lateral edges of the first seat 5, and a receptacle 7a is formed therein, has a preferably circular cross-section and is open toward the inside of the link 1, in order to support the ends of a transverse pivot, not shown in the figure, which can be inserted within the through slot or hole formed in the lug 3 so as to ensure the connection between two consecutive links 1.

Said pivot has a smaller diameter than the through slot or hole; since the first seat 5 further is wider than the lug 3, relative rotation between two adjacent links 1 on the conveyance plane is allowed and occurs at curved portions of the conveyor chain.

The link of conveyor chain 1 according to the invention can therefore be used both to provide straight conveyance portions and curved conveyance portions, according to the requirements of each specific case.

Two tabs 8 can protrude radially in the opposite direction from the lower ends of the wings 6, each protruding toward the outside of the link 1; the tabs 8 can be inserted slidingly within complementarily shaped seats formed on a guide, which is not shown in the figures, and which slidingly supports the links 1, so as to contrast forces which act in the direction for lifting said links and can occur for example at curved portions of the conveyor chain.

Two shoulders 10a and 10b protrude upward at the lateral ends of the transverse sides of the main base body 2 and are arranged parallel to the advancement direction of the chain; suitable first 10c and second 10d seats are formed thereon and are mutually aligned along axes which are longitudinal with respect to the main base body 2 and transverse to the advancement direction of the chain, with which the ends of two first and second shafts, designated by the reference numerals 9a and 9b, are rotatably associated, said shafts being arranged on a same plane which is approximately parallel to the plane of arrangement of the surface of the main base body 2 from which the two shoulders 10a and 10b protrude.

Preferably, the first and second shafts 9a and 9b are parallel to each other and to the sides of the respective shoulder 10a and 10b, so as to leave a clear central seat; a plurality of first axially perforated rollers 14 are further rotatably associated with each one of the first and second shafts 9a and 9b, in particular with the shafts inserted therethrough.

At least two first supporting elements protrude upward from the main base body 2, each element being constituted by two protrusions 12a, 12b and 12c, 12d, which are arranged in pairs on the same plane or on a separate plane which lies transversely to said pair of first and second shafts.

Each protrusion 12a, 12b, 12c, 12d has, in plan view, an approximately rectangular shape, is parallel to the shoulders 10a and 10b, and is advantageously arranged in a mirror-symmetrical manner with respect to the central axis which lies transversely to the main base body 2.

Each protrusion 12a, 12b, 12c, 12d, in a side view, is shaped approximately like an inverted right-angled trapezoid, in which the shorter parallel side is arranged upward and the longer parallel side is rigidly coupled to the main base body.

Above each protrusion 12a, 12b, 12c, 12d there are provided, at the shorter parallel side, one or more third seats 13, which are approximately semicircular in cross-section and on which the complementarily shaped lateral surfaces of a second roller 15 interact in the loading condition for said link, said roller being perforated axially and having a diameter which is smaller than the diameter of the first rollers 14 and of the third seats 13.

The first rollers 14 are arranged along the entire axis of the pair of first and second shafts 9a and 9b, except for the regions where the two protrusions 12a, 12b and 12c, 12d protrude from the main base body 2, and second rollers 15 engage in such protrusions; the second rollers 15 advantageously have a rolling surface which is centrally concave and is arranged between two flat lateral shoulders thereof. Since the second rollers 15 have a smaller diameter than the third seats 13 and are supported rotatably by the pair of first and second shafts 9a and 9b, they do not rest on said third seats when said pair of lateral shafts is arranged in a straight configuration, for example when no load is present on the first rollers 14. The link further comprises a slider 9c, which has an upper surface 60 which lies on a plane which is approximately tangent to the adjacent lateral surfaces of the first rollers associated with said first and second shafts. The slider 9c is interposed advantageously between said first and second shafts 9a, 9b and is supported by at least one pair of second supporting elements, which protrude from the main base body 2 and are each constituted by two lugs 51a and 51b, which have a slotted incision or guide in the upper surface which is adapted to receive and support a complementarily shaped ridge 70, which protrudes downward from said slider 9c. The two lugs 51a and 51b are arranged along a distinct plane, which is transverse with respect to the slider 9c and is also distinct with respect to the plane of arrangement of said first supporting elements 12a, 12b, 12c, 12d.

Advantageously, said two lugs are each arranged in the space that is not comprised between said pair of first supporting elements 12a, 12b, 12c, 12d and are therefore adjacent to said pair of shoulders.

The slider 9c further has its ends 52a and 52b free and not connected to the two shoulders 10a and 10b.

End lugs 61 protrude downward from the ends 52a and 52b and are approximately shaped like a triangle with a rounded vertex which acts rotatably on complementarily shaped guides 53a and 53b, which protrude from the main base body 2 in a region which is adjacent to the pair of shoulders 10a and 10b.

The operation of the link of conveyor chain according to the invention entails that if no load or a light load, constituted for example by an empty bottle, is present thereon, the pair of first and second shafts 9a and 9b has an approximately straight non-deformed configuration, so that the second rollers 15 are raised with respect to the respective facing third seat 13.

In this operating condition, the pair of first and second shafts 9a and 9b is rotatably associated only with the shoulders 10a and 10b, while the first and second rollers 14 and 15 are free to rotate in order to allow relative sliding of the product supported thereby with respect to the link 1, for example if said product supported thereby is locked in a chosen position by a retention barrier; low drag opposing the advancement of the conveyor chain is thus generated.

If the load conveyed by the link 1 is considerably heavy, the two first and second shafts 9a and 9b are arranged according to a deformed configuration; if the weight of said load exceeds a preset value, which can be defined for example analytically or experimentally, the lateral surface of the second rollers 15 makes contact with the corresponding surface of the third seat 13, so as to constitute a supporting point for the two first and second shafts.

In this condition, the second rollers 15 do not rotate freely, since they are locked by the friction between its lateral surface and the surface of the third seat 13; the presence of the second rollers 15, however, avoids the wear of the protrusions 12a, 12b, 12c and 12d, since there is no direct contact with the two first and second shafts, which rotate, and the surface of the third seat 13, which is fixed.

Further, the second rollers 15 rest on the surface of the third seat 13, remaining locked in their rotation, only if the weight of the conveyed load exceeds a preset value; wear processes are thus slowed further, since if a lightweight load is conveyed, the second rollers 15 are not in contact with the protrusions and therefore can rotate freely, no action being applied to the protrusions.

If debris, constituted for example by glass splinters caused by the breakage of conveyed bottles or by dirt from the surrounding environment, occurs on the link 1, it is further very easy to clean said link also at the central support.

This applies also to the slider 9c at the ends 52a and 52b, which are not supported by the two shoulders 10a and 10b.

Further, the presence of the second rollers 15 allows to obtain good uniformity of the upper loading surface, since the difference between the outside diameters of the first and second rollers can be very small; good positioning is therefore insured even in the case of products which have a narrow resting base.

The presence of the surface 60 of the slider further allows to support bulky loads in an optimum manner.

It has thus been found that the invention has achieved the intended aim and objects, an invention having been provided which allows to ensure low wear thereof during operation as well as quick and easy cleaning thereof, so as to require reduced line downtimes.

Finally, the invention allows optimum positioning of the conveyed products, even if said products have a narrow resting base or are constituted by bulky loads.

Of course, the materials used, as well as the dimensions that constitute the individual components of the invention, may of course be more pertinent according to specific requirements.

The various means for performing certain different functions need not certainly coexist only in the illustrated embodiment, but may be present per se in many embodiments, including ones which are not illustrated.

The characteristics indicated as advantageous, convenient or the like may also be omitted or be replaced with equivalents.

The disclosures in Italian Patent Application No. TV2005A000120 from which this application claims priority are incorporated herein by reference.

What is claimed is:

1. A link of a conveyor chain, comprising:
    connection means for articulated connection to a similar and adjacent link;
    a main base body;
    two shoulders, which protrude upward from ends of transverse sides of said main base body and are arranged parallel to a direction of advancement of said chain;
    a pair of first and second shafts having ends thereof respectively associated with said pair of shoulders;
    first rollers being rotatably associated with said first and second shafts;
    second rollers associated on said pair of first and second shafts, said second rollers having a smaller diameter than said first rollers;
    at least one pair of first supporting elements that support, in a condition in which the link is loaded, said second rollers, said at least one pair of supporting elements being activatable when a load passes and protrude from said main base body and lie on a plane which is transverse with respect to said pair of first and second shafts;
    at least one pair of second supporting elements which protrude from said main base body and lie on a plane which is parallel to and distinct with respect to the plane on which said first supporting elements lay; and,
    a slider supported by said at least one pair of second supporting elements and having ends thereof which are free and are supported on said main base body.

2. The link of claim 1, wherein each one of said protrusions has, in a side view, a shape of an inverted right-angled trapezoid, in which a shorter parallel side is directed upward and a longer parallel side is rigidly coupled to the main base body;

at least one third seat being formed above each one of said protrusions at the shorter parallel side, said at least one third seat having a semicircular cross-section;

complementarily shaped lateral surfaces of said second rollers interacting on said third seats formed on said protrusions in a loading condition of the link; and, said second rollers being axially perforated and having a smaller diameter than said first rollers and said third seats.

3. The link of claim 2, wherein said first rollers are arranged along an entire axis of said pair of first and second shafts, except for regions where said protrusions on which said second rollers interact protrude from said main base body.

4. The link of claim 3, wherein said second rollers have a smaller diameter than said third seats and are supported rotatably by said pair of first and second shafts.

5. The link of claim 3, wherein said second rollers are located away from said third seats when said pair of first and second shafts is arranged along a rectilinear configuration, when no load is present on said first rollers.

6. A link of a conveyor chain, comprising:

a main base body;

two shoulders that protrude upward and at lateral ends of transverse sides of said main base body;

said shoulders being arranged parallel to an advancement direction of the chain;

a pair of first and second shafts;

first and second seats formed on said shoulders and being mutually aligned along an axis which is longitudinal with respect to said main base body and transverse with respect to the advancement direction of the chain and with which ends of said pair of first and second shafts are associated;

a plurality of first free rollers that are rotatably associated with said first and second shafts and are arranged on a same plane which is parallel to a plane of arrangement of a surface of said main base body from which said two shoulders protrude;

second rollers associated on said pair of first and second shafts, said second rollers having a smaller diameter than said first rollers;

at least one pair of first supporting elements that support, in a condition in which the link is loaded, said second rollers and that protrudes upward from said main base body, each supporting element being constituted by two protrusions which are arranged in pairs along planes that are transverse with respect to said first and second shafts, each one of said protrusions having, in plan view, a rectangular shape and being arranged parallel to said pair of shoulders in a position which is mirror-symmetrical with respect to a central axis that lies transversely to said main base body; and, a slider which has an upper surface arranged on a plane which is tangent to adjacent lateral surfaces of said first rollers associated with said first and second shafts.

7. The link of claim 6, comprising second supporting elements constituted by lugs that are arranged along a distinct plane which lies transversely to said slider and is also distinct with respect to the planes of arrangement of said first supporting elements.

8. The link of claim 7, wherein said slider is supported by said at least one pair of second supporting elements, which protrude from said main base body and are each constituted by two said lugs which have a slotted incision or guide on an upper surface thereof, said incision or guide being adapted to receive and support a complementary shaped ridge which protrudes downward from said slider.

9. The link of claim 8, wherein each one of said two lugs is arranged in a respective space that has a different extension than a space comprised between said pair of first supporting elements, said respective spaces of arrangement of said lugs being adjacent to said pair of shoulders.

10. The link of claim 9, wherein said slider has free ends unconnected to said pair of shoulders.

11. The link of claim 10, comprising end lugs that protrude downward from the ends of said slider and are shaped like a triangle with a rounded vertex, said end lugs acting rotatably on complementarily shaped guides which protrude from said main base body in a region which is adjacent to said pair of shoulders.

12. The link of claim 9, wherein said first and second shafts are parallel to each other and to sides of a respective one of said shoulders, so as to leave a central seat free for said slider.

* * * * *